(12) United States Patent
Utevsky et al.

(10) Patent No.: US 11,853,554 B2
(45) Date of Patent: Dec. 26, 2023

(54) ALIGNED AND UNALIGNED DATA DEALLOCATION

(71) Applicant: Western Digital Technologies, Inc., San Jose, CA (US)

(72) Inventors: Galya Utevsky, Petah Tiqwa (IL); Marina Frid, Jerusalem (IL); Igor Genshaft, Bat Yam (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/713,736

(22) Filed: Apr. 5, 2022

(65) Prior Publication Data

US 2023/0315296 A1  Oct. 5, 2023

(51) Int. Cl.
*G06F 3/06* (2006.01)
*G06F 12/02* (2006.01)
*G06F 12/0875* (2016.01)

(52) U.S. Cl.
CPC .......... *G06F 3/0611* (2013.01); *G06F 3/0659* (2013.01); *G06F 3/0679* (2013.01);
(Continued)

(58) Field of Classification Search
CPC .... G06F 3/0611; G06F 3/0659; G06F 3/0679; G06F 12/0246; G06F 12/0875; G06F 2212/1024
See application file for complete search history.

(56) References Cited

U.S. PATENT DOCUMENTS

| 8,601,222 B2 | 12/2013 | Flynn et al. |
| 9,229,863 B2 | 1/2016 | Yoshihashi et al. |

(Continued)

FOREIGN PATENT DOCUMENTS

CN     113031866 A     6/2021

OTHER PUBLICATIONS

USENIX Association, "Proceedings of the 19th USENIX Conference on File and Storage Technologies (FAST 21)", Retrieved from Internet URL: https://www.usenix.org/sites/default/files/fast21_full-proceedings.pdf, Retrieved on Jul. 18, 2023, 439 pages, (Feb. 23-25, 2021).

(Continued)

*Primary Examiner* — Tasnima Matin
(74) *Attorney, Agent, or Firm* — PATTERSON + SHERIDAN, LLP; Steven H. VerSteeg (57) ABSTRACT

A data storage device includes a memory device and a controller coupled to the memory device. The controller is configured to receive a deallocation command corresponding to a plurality of deallocation requests, where each of the plurality of deallocation requests corresponds to a logical block address (LBA) range, determine that at least one of the plurality of deallocation requests is an unaligned deallocation request, generate a tag for metadata for the unaligned deallocation request, wherein the tag for the metadata includes a direction bit and a length bit, concatenate the metadata including the tag to an LBA range of the unaligned deallocation request, and complete the deallocation command using the metadata including the tag. Aligned deallocation requests are stored in a buffer. The concatenated unaligned deallocation requests are completed prior to completing the aligned deallocation requests from the buffer.

19 Claims, 6 Drawing Sheets

(52) U.S. Cl.
CPC ...... *G06F 12/0246* (2013.01); *G06F 12/0875* (2013.01); *G06F 2212/1024* (2013.01)

(56) References Cited

U.S. PATENT DOCUMENTS

| | | |
|---|---|---|
| 10,073,656 B2 | 9/2018 | Zhe Yang et al. |
| 10,909,030 B2 | 2/2021 | Desai et al. |
| 2012/0221776 A1* | 8/2012 | Yoshihashi ......... G06F 12/0866 711/E12.008 |
| 2013/0227236 A1 | 8/2013 | Flynn et al. |
| 2014/0201167 A1 | 7/2014 | Dar et al. |
| 2014/0258675 A1* | 9/2014 | Takeuchi .............. G06F 3/0659 711/206 |
| 2020/0081830 A1* | 3/2020 | Desai .................. G06F 12/0246 |
| 2020/0333969 A1 | 10/2020 | Cohen |

OTHER PUBLICATIONS

Yang, F., et al., "A Highly Non-Volatile Memory Scalable and Efficient File System", 2018 IEEE 36th International Conference on Computer Design (ICCD), pp. 431-438, Oct. 7-10, 2018.

* cited by examiner

ALIGNED AND UNALIGNED DATA DEALLOCATION

BACKGROUND OF THE DISCLOSURE

Field of the Disclosure

Embodiments of the present disclosure generally relate to data storage devices, such as solid state drives (SSDs), and, more specifically, executing aligned and unaligned data deallocation requests.

Description of the Related Art

Data is stored to a memory device of a data storage device. When updates to the data are received, the previously written data associated with the updates may be out-of-date or irrelevant. Therefore, in order to recover space, the data storage device may receive a deallocation request from a host device that is coupled to the data storage device. The deallocation request may indicate to the data storage device which data stored in the memory device are out-of-date or irrelevant and may be erased. The deallocation operation may be performed in static random access memory (SRAM) or dynamic random access memory (DRAM). In data storage devices having a limited amount of random access memory (RAM) resources, the flash management tables storing logical block addresses (LBAs) for data stored in a memory device, such as non-volatile memory (NVM), may be stored in the NVM. When storing the flash management tables in the NVM, the flash management tables may need to be synchronized with ongoing updates.

Because the synchronization operation requires bandwidth and resources, deallocation operations occurring while synchronization operations are occurring incur a bottleneck and, with high loads, may even cause overall storage system timeout failures. For example, certain storage systems may require that 98.5% of input/output (I/O) commands be completed in less than 100 ms and that all I/O and deallocate commands be completed in less than 500 ms. When the I/O command or the deallocate command takes greater than 500 ms to complete, a timeout of the command occurs. Additionally, an ungraceful shutdown (UGSD) event during the middle of a deallocation operation may cause a recovery issue since part of the payload may reflected as already deallocated while other parts of the payload are not deallocated yet. Thus, overall storage system performance may be impacted.

Therefore, there is a need in the art for an improved deallocation operation.

SUMMARY OF THE DISCLOSURE

The present disclosure generally relates to data storage devices, such as solid state drives (SSDs), and, more specifically, executing aligned and unaligned data deallocation requests. A data storage device includes a memory device and a controller coupled to the memory device. The controller is configured to receive a deallocation command corresponding to a plurality of deallocation requests, where each of the plurality of deallocation requests corresponds to a logical block address (LBA) range, determine that at least one of the plurality of deallocation requests is an unaligned deallocation request, generate a tag for metadata for the unaligned deallocation request, wherein the tag for the metadata includes a direction bit and a length bit, concatenate the metadata including the tag to an LBA range of the unaligned deallocation request, and complete the deallocation command using the metadata including the tag. Aligned deallocation requests are stored in a buffer. The concatenated unaligned deallocation requests are completed prior to completing the aligned deallocation requests from the buffer.

In one embodiment, a data storage device includes a memory device and a controller coupled to the memory device. The controller is configured to receive a deallocation command corresponding to a plurality of deallocation requests, where each of the plurality of deallocation requests corresponds to a logical block address (LBA) range, determine that at least one of the plurality of deallocation requests is an unaligned deallocation request, generate a tag for metadata for the unaligned deallocation request, wherein the tag for the metadata includes a direction bit and a length bit, concatenate the metadata including the tag to an LBA range of the unaligned deallocation request, and complete the deallocation command using the metadata including the tag.

In another embodiment, a data storage device includes a memory device and a controller coupled to the memory device. The controller is configured to determine that a first buffer of a plurality of buffers comprises one or more unaligned deallocation commands and a second buffer of the plurality of buffers consists of aligned deallocation commands, generate a delayed deallocate bitmap for the second buffer, generate a tag for metadata for each of the one or more unaligned deallocation commands, where the tag for the metadata includes a direction bit and a length bit, store the plurality of buffers and a payload corresponding to the plurality of buffers in the memory device, and perform each deallocation command, where deallocation commands associated with the first buffer are performed prior to deallocation commands of the second buffer.

In another embodiment, a data storage device includes memory means and a controller coupled to the memory means. The controller is configured to generate a tag for metadata for unaligned deallocation commands. The tag for the metadata indicates a read direction of a logical block address (LBA) range of an unaligned deallocation command and a length of the LBA range.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, executing aligned and unaligned data deallocation requests. A data storage device includes a memory device and a controller coupled to the memory device. The controller is configured to receive a deallocation command corresponding to a plurality of deallocation requests, where each of the plurality of deallocation requests corresponds to a logical block address (LBA) range, determine that at least one of the plurality of deallocation requests is an unaligned deallocation request, generate metadata for the unaligned deallocation request, wherein the metadata includes a direction bit and a length bit, concatenate the generated metadata to an LBA range of the unaligned deallocation request, and complete the deallocation command using the generated metadata. Aligned deallocation requests are stored in a buffer. The concatenated unaligned deallocation requests are completed prior to completing the aligned deallocation requests from the buffer.

Figure 1:
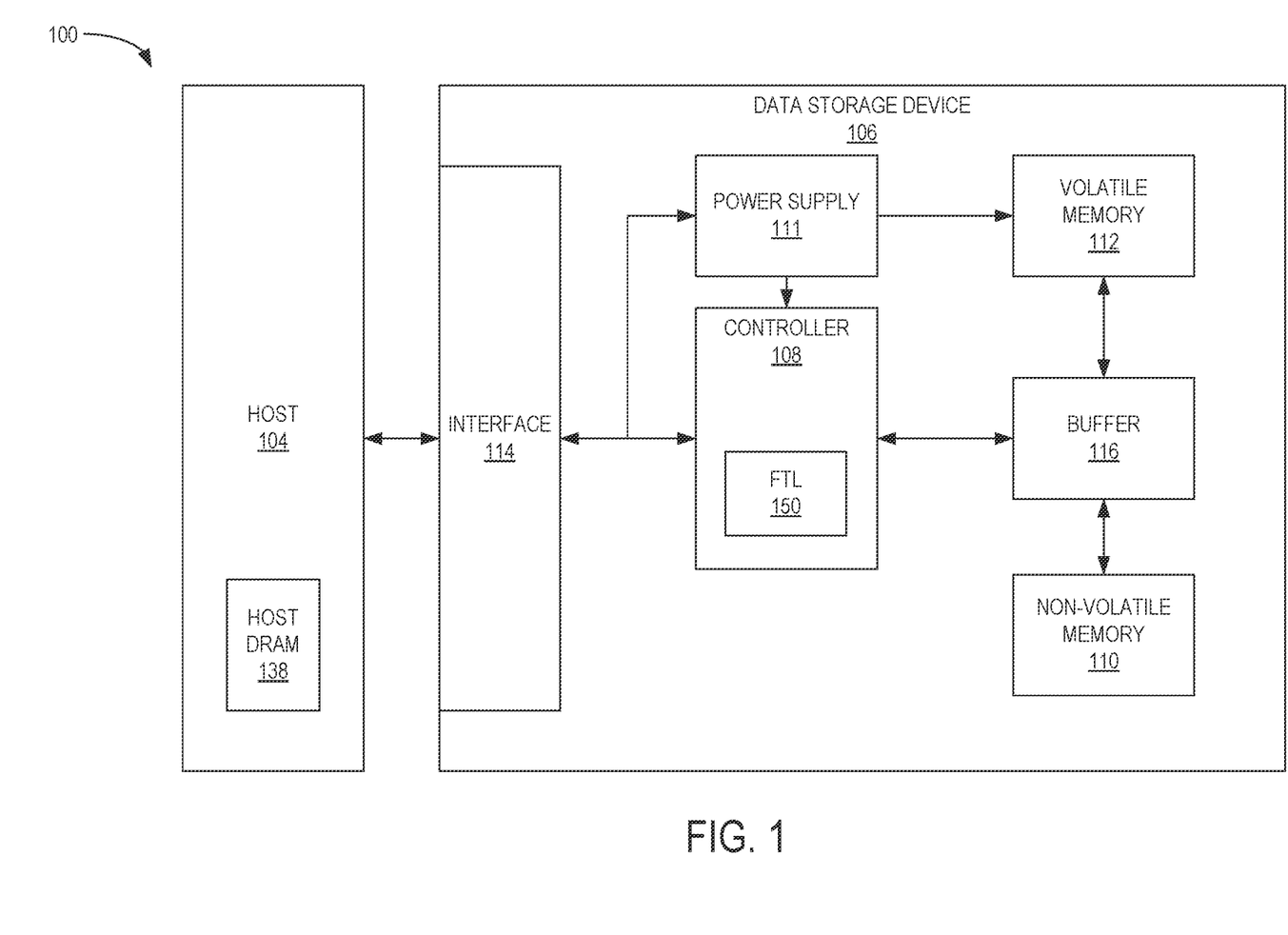
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. The controller 108 includes a flash translation layer (FTL) 150, where the FTL 150 may perform logical-to-physical address translation, garbage collection, wear-leveling, error correction code (ECC), and bad block management. In another example, the FTL 150 may be coupled to the controller 108.

Figure 2:
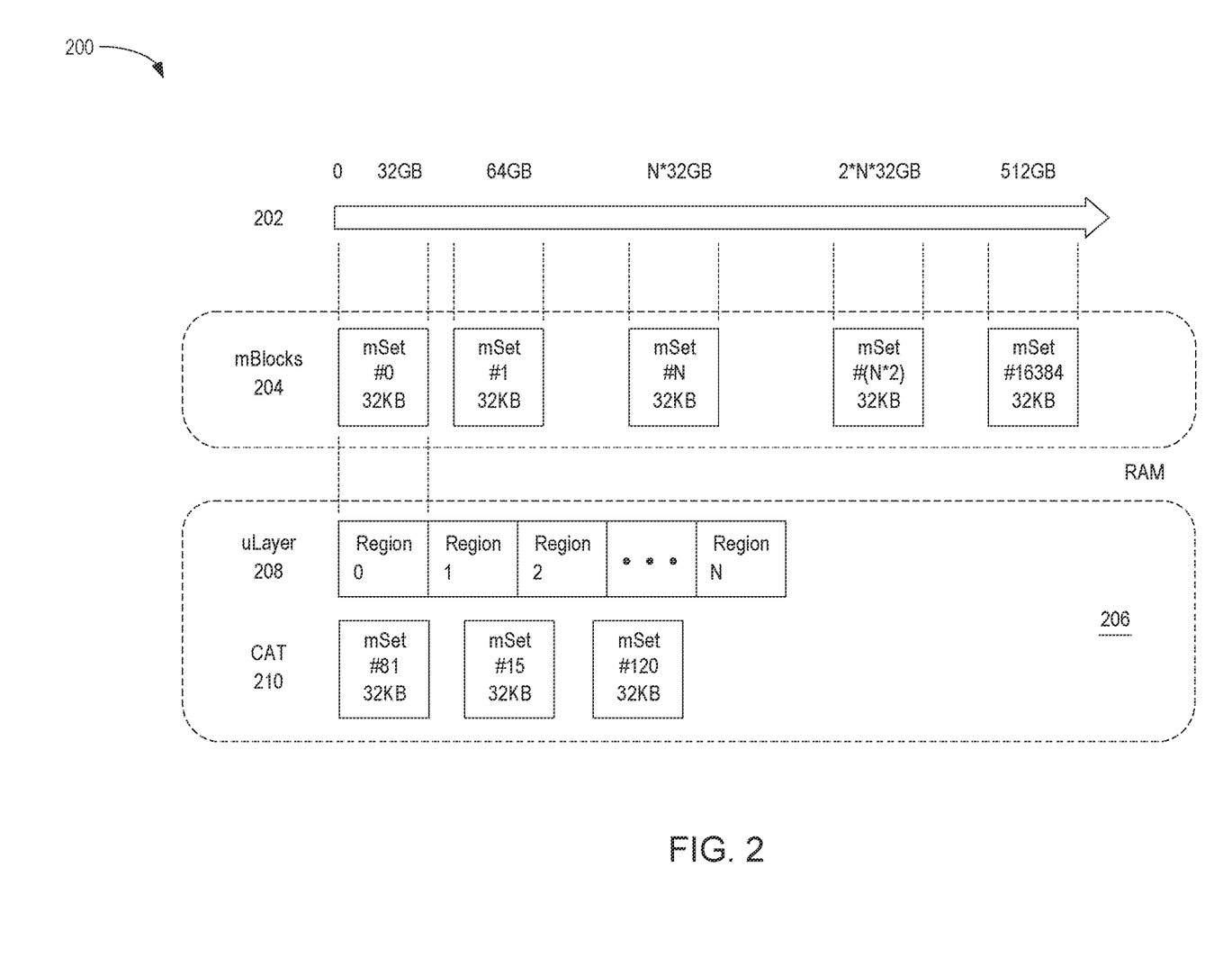
FIG. 2 is an exemplary illustration of a mapping of a memory space of a memory device, according to certain embodiments.

FIG. 2 is an exemplary illustration of a mapping of a memory space 202 of a memory device, which may be the NVM 110 of FIG. 1, according to certain embodiments. It is to be understood that the listed values illustrated and described herein are not intended to be limiting, but to provide an example of a possible embodiment. The memory space 202 includes at least about 512 GB of storage space, where each about 32 GB chunk of storage space is mapped to an mBlock of a plurality of mBlock 204. Each mBlock may have a size of about 32 KB. Furthermore, each mBlock includes one or more mSets, where each mSet includes updates associated with the respective memory space chunk. For example, a first 32 GB chunk (e.g., 0-32 GB) is mapped to mSet #0, a second 32 GB chunk (e.g., 32-64 GB) is mapped to mSet #1, and so-forth. Therefore, updates to the first 32 GB chunk (e.g., 0-32 GB) are stored in MSet #0.

It is to be understood that values corresponding to the sizes described above and described herein are not intended to be limiting. For example, a FMU may be described as having a size of about 4 KB and an mSet may be described as having a size of about 32 KB. However, the sizes previously listed are not intended to be limiting and other sizes may be applicable to the described embodiments.

The updates stored in each respective mSet are also maintained in corresponding region of uLayer 208 of a random access memory (RAM) 206. The RAM 206 may be the volatile memory 112 of FIG. 1. In some examples, the RAM 206 may be stored in a controller, such as the controller 108 of FIG. 1. For example, mSet #0 is maintained in Region 0 of the uLayer 208. Furthermore, each update (e.g., mSet #0, mSet #1, etc.) are stored in a cached address table (CAT) 210 in the RAM 206. The CAT 210 may store the mSets by chronological order, such that updates that are older in arrival time are stored towards the head of the CAT 210 and updates that are newer in arrival time are stored towards the tail of the CAT 210.

Figure 3:
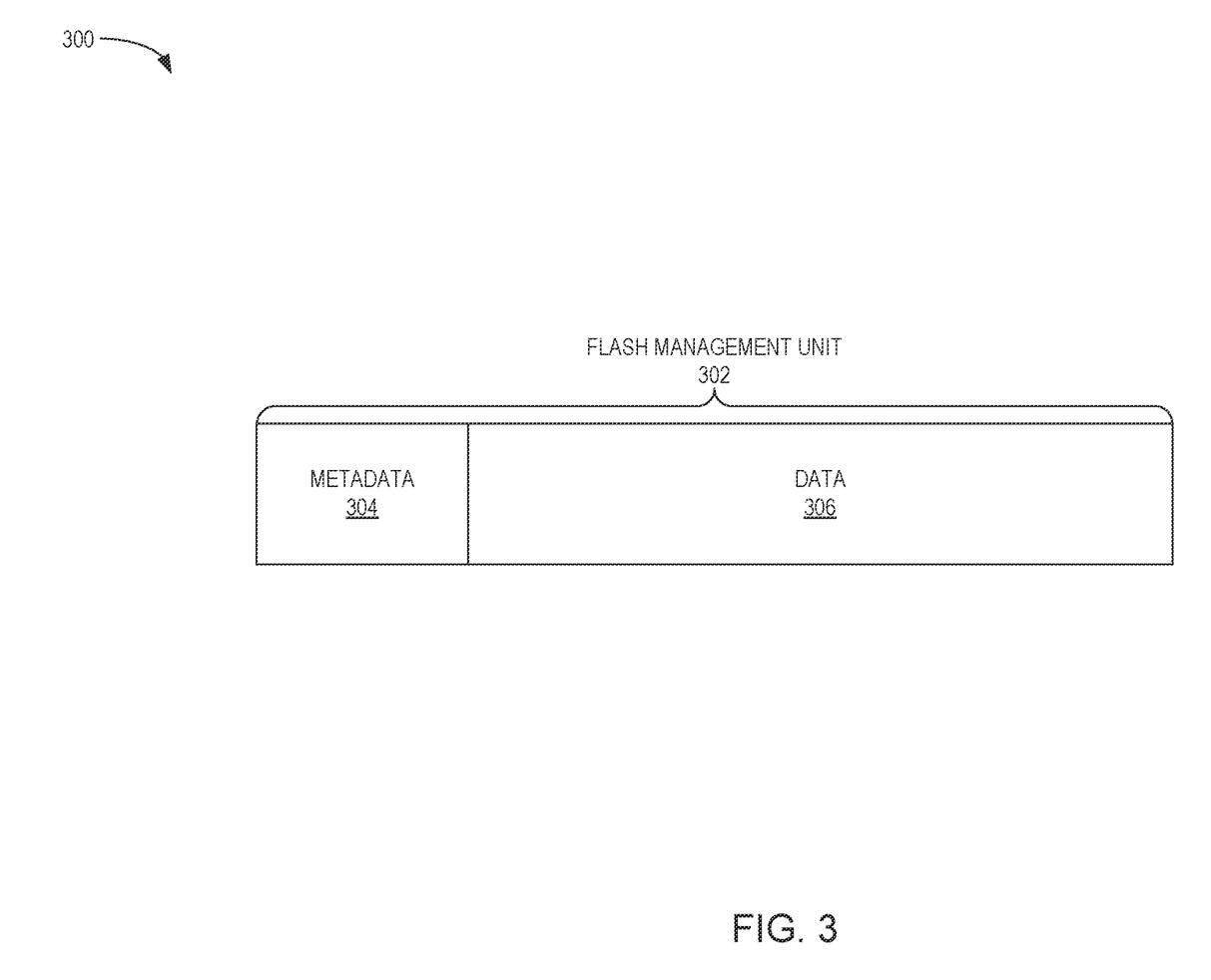
FIG. 3 is an exemplary illustration of a flash management unit, according to certain embodiments.

FIG. 3 is an exemplary illustration of a flash management unit (FMU) 302, according to certain embodiments. For exemplary purposes, aspects of FIG. 1 may be referenced herein. The FMU 302 includes metadata 304 and data 306. The FMU 302 may have a size of about 4 KB. The metadata 304 may include information regarding the data 306, where the data 306 may include read-modify-write operation information, such as information regarding programming updated data to the NVM 110 and where the outdated data is on the NVM 110. Additionally, the metadata 304 may include other overhead data for the data 306. According to the NVMe specification, for example, 256 logical block address (LBA) ranges may be sent from a host device, such as the host device 104, as a single deallocation command. Each of the 256 LBA ranges has a 'head' and a 'tail'. Thus, each of the 256 LBA ranges may be unaligned with a boundary of the FMU with respect to the 'head' of the LBA range, the 'tail' of the LBA range, or both the 'head' of the LBA range and the 'tail' of the LBA range.

Furthermore, each FMU 302 may be accumulated in a buffer, where the buffer may be in RAM, such as SRAM or DRAM, the volatile memory 112, or a host memory buffer (HMB) located in the host DRAM 138. The buffer may hold about 32 KB of data, such that about 8 FMUs may be stored in the buffer. In some examples, there may be one or more buffers associated with FMU storage. When sending the FMU 302 payload from the buffer, the controller 108 may send the FMUs to the FTL 150, where the FTL 150 receives the FMUs and a deallocate range. In other words, the FTL 150 receives the read-modify-write operations associated with the received FMUs and the deallocate range.

In cases of high payloads, the deallocation operations may become inefficient due to serialization, where the same mSet, such as mSet #0 of FIG. 2, may be read and written twice or more for each update within each FMU. Furthermore, a timeout may occur during the processing of the FMUs or the LBA ranges due to the LBA ranges not being aligned to a mSet size. For example, the timeout may occur on a second deallocation/trim command because the first deallocation/trim command is waiting for completion and the second deallocation/trim command is delayed.

Therefore, in order to improve management of unaligned deallocation requests during a deallocation operation, additional metadata may be added to the metadata 304. The additional metadata includes a direction bit and a deallocation length bit. The direction bit may be about 1 bit and the deallocation length bit may have a number of bits proportional or as a function of a length of metadata. For example, the deallocation length bit may be about 6 bits. The direction bit may determine whether to read from a 'head' or a 'tail' of the LBA range, such that reading from a 'head' of the LBA range indicates that the 'tail' of the LBA range may be unaligned with a FMU boundary or that reading from a 'tail' of the LBA range indicates that the 'head' of the LBA range may be unaligned with the FMU boundary. In cases where both the 'head' and the 'tail' of the LBA range are unaligned with the FMU boundary, the controller 108 may add enough metadata, including the direction bit and the deallocation length bit, to align the LBA range with either the 'head' or the 'tail' of the LBA range. In some examples, the controller 108 may indicate to read from the unaligned 'head' of the unaligned LBA range when both the 'head' and the 'tail' are unaligned. Thus, the direction bit and the deallocation length bit determines the direction and length of the deallocated/erased/trimmed data.

Figure 4:
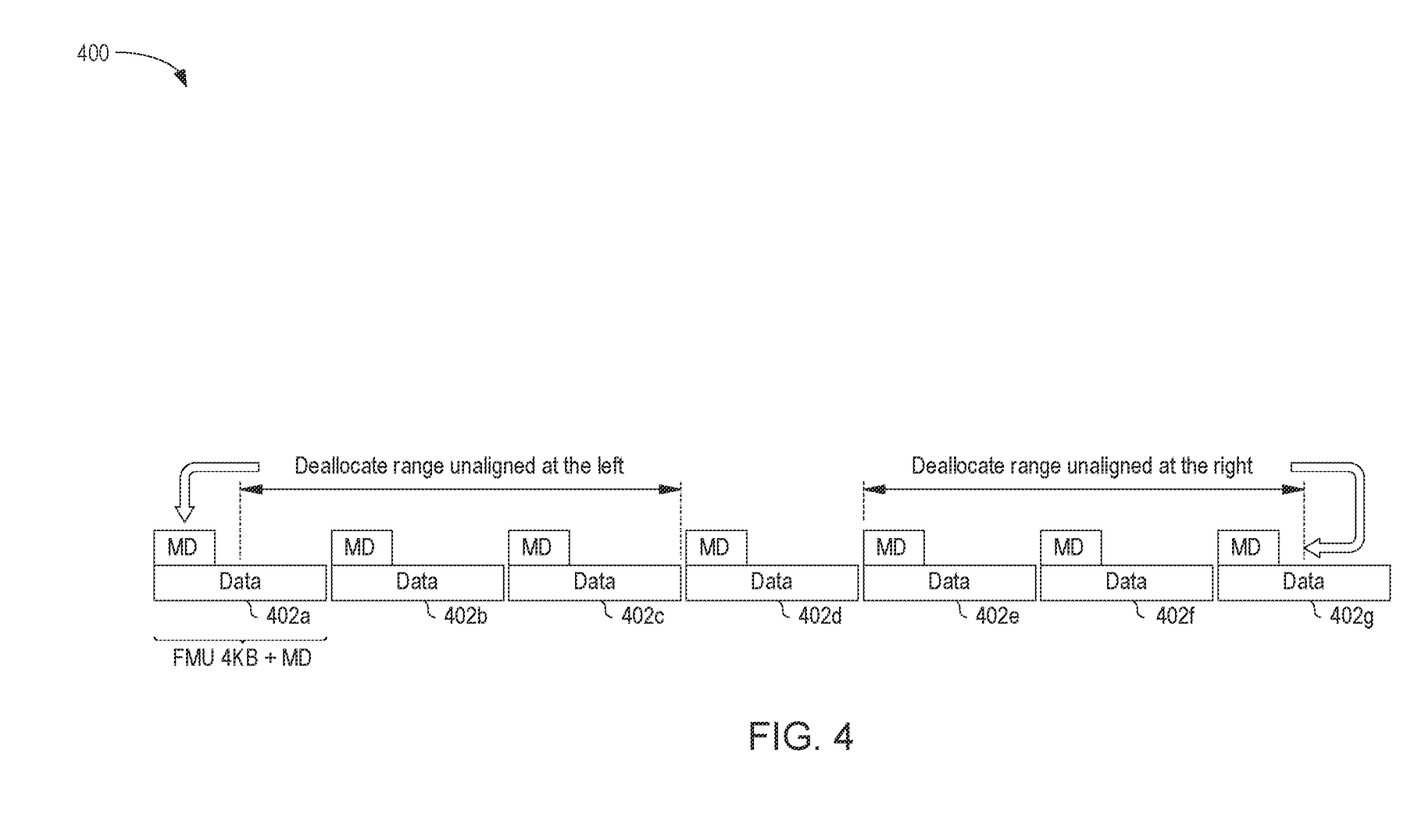
FIG. 4 is an exemplary illustration of a deallocate range, according to certain embodiments.

FIG. 4 exemplary illustration of a deallocate range 400, according to certain embodiments. The deallocate range 400 includes a plurality of FMUs 402a-402g. It is to be understood that the number of FMUs shown is not intended to be limiting. Each FMU includes metadata, indicated as "MD", and data. For example, a first FMU 402a includes MD and data, a second FMU 402b includes MD and data, and so-forth. The deallocate range 400 includes an example of an unaligned range at the left and an unaligned range at the right. The deallocate range 400 may be unallocated due to the FMU being unaligned to a FMU boundary of the deallocate range 400.

Based on whether the 'head' or the 'tail' of the LBA range corresponding to a deallocation command, the controller 108 may add a deallocation length bit and a direction bit to the corresponding MD. For example, if the 'head' of the deallocate range 400 is unaligned, then the deallocation length bit and the direction bit are added to the MD of the first FMU 402a. However, if the 'tail' of the deallocate range 400 is unaligned, then the deallocation length bit and the direction bit are added to the MD of a last FMU (e.g., seventh FMU 402g) of the deallocate range. If both the 'head' and the tail' are unaligned, then the deallocation length bit and the direction bit are added to the MD of the first FMU 402a. Referring to FIG. 2, the deallocate range 400 may correspond to an mSet of the uLayer 208. By adding the direction bit and the deallocation length bit to the relevant MD of the deallocate range 400, a corresponding mSet may be updated once because the offsets are in one payload.

Figure 5:
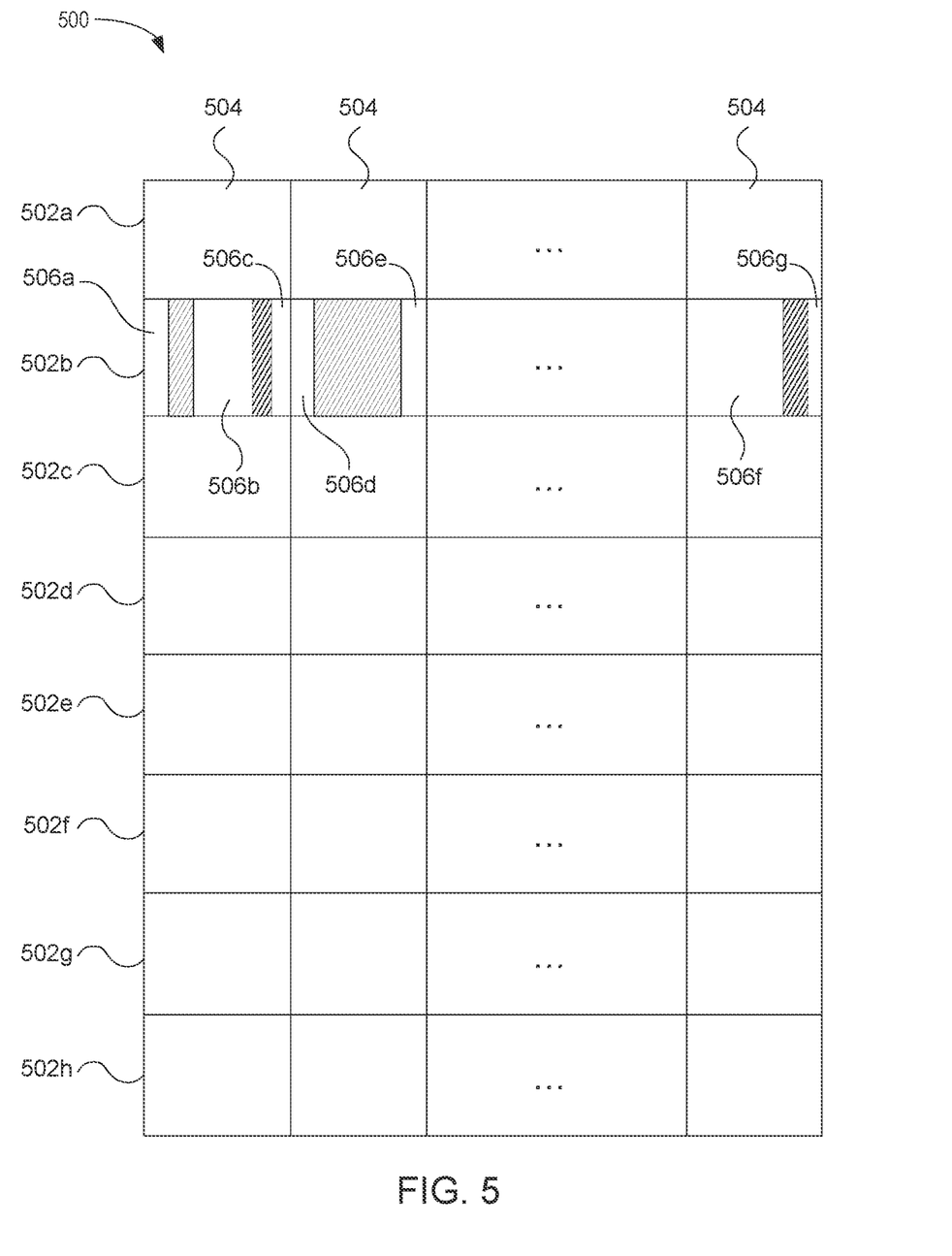
FIG. 5 is an exemplary illustration of a plurality of buffers storing deallocation requests, according to certain embodiments.

FIG. 5 is an exemplary illustration of a plurality of buffers 502a-502h storing deallocation requests, according to certain embodiments. For exemplary purposes, the storage system 100 of FIG. 1 may be referenced herein. Each buffer of the plurality of buffers 502a-502h may be the buffer described in FIG. 3 above. Each buffer of the plurality of buffers 502a-502h may store up to 8 FMUs, where each FMU 504 may be the FMU 302 of FIG. 3. It is to be understood that the previously listed values and the illustrated number of buffers is not intended to be limiting, but to provide an example of a possible embodiment. When a deallocation command is received from the host, where the deallocation command includes a plurality of LBA start points and ranges (i.e., lengths), the FTL 150 may be configured to collect the invalid data pointers and lengths in a buffer of the plurality of buffers 502a-502h. The FTL 150 may further perform the deallocation operation that includes updating mSets. In some examples, the plurality of buffers 502a-502h may be stored in an open block with unaligned read-modify-write buffers.

A plurality of unaligned LBA ranges 506a-506g are stored in a second buffer 502b. The controller 108 is configured to handle a request for unaligned and aligned FMU deallocate requests together. If a 'tail' or a 'head' of an LBA range is unaligned with a boundary of the FMU 504, additional metadata including a direction bit and a deallocation length bit is added to the unaligned LBA range. If a 'tail' or a 'head' of an LBA range is unaligned with a mapping unit (e.g., aligned to a 32 KB mSet), the unaligned LBA range is added to an unaligned payload buffer, such as the second buffer 502b. If the payload of the second buffer 502b storing the unaligned deallocation request is less than about 4 KB, then the controller 108 may additionally store other unaligned deallocation requests to the second buffer. If an LBA range is aligned to a mapping unit (e.g., aligned to a 32 KB mSet), then the aligned LBA ranges are added to a delayed bitmap buffer. For example, the first buffer 502a consists of aligned LBA ranges. If the delayed bitmap buffer includes an entry that is less than a size of about 4 KB, then the entry that is less than a size of about 4 KB of the delayed bitmap buffer is added to a buffer storing unaligned deallocation requests. For example, if an ungraceful shutdown occurs while completing deallocation requests, then one or more deallocation requests may be unaligned.

Referring to the plurality of buffers 502a-502h, the second buffer 502b includes unaligned deallocation requests, the first buffer includes aligned deallocation requests, and a third buffer 502c through an eighth buffer 502h includes aligned deallocation requests. The second buffer 502b includes a first unaligned deallocation request 506a, a second unaligned deallocation request 506b, a third unaligned deallocation request 506c, a fourth unaligned deallocation request 506*d*, a fifth unaligned deallocation request 506*e*, a sixth unaligned deallocation request 506*f*, and a seventh unaligned deallocation request 506*g*. The first unaligned deallocation request 506*a* is unaligned with the 'tail' of the FMU 504, the second unaligned deallocation request 506*b* is unaligned with both the 'head' and the 'tail' of the FMU 504, the third unaligned deallocation request 506*c* is unaligned with the 'head' of the FMU 504, the fourth unaligned deallocation request 506*d* is unaligned with the 'tail' of the FMU 504, the fifth unaligned deallocation request 506*e* is unaligned with the 'head' of the FMU 504, the sixth unaligned deallocation request 506*f* is unaligned with the 'tail' of the FMU 504, and the seventh unaligned deallocation request 506*g* is unaligned with the 'head' of the FMU. For each of the plurality of unaligned deallocation requests, a direction bit and a deallocation length bit is generated by the FTL 150 or the controller 108 and added to the metadata of each FMU 504. Thus, when completing the deallocation requests of the second buffer 502*b*, the controller 108 or the FTL 150 may determine which side (e.g., 'head' or 'tail' of the unaligned request to read from and the length of the LBA range.

Figure 6:
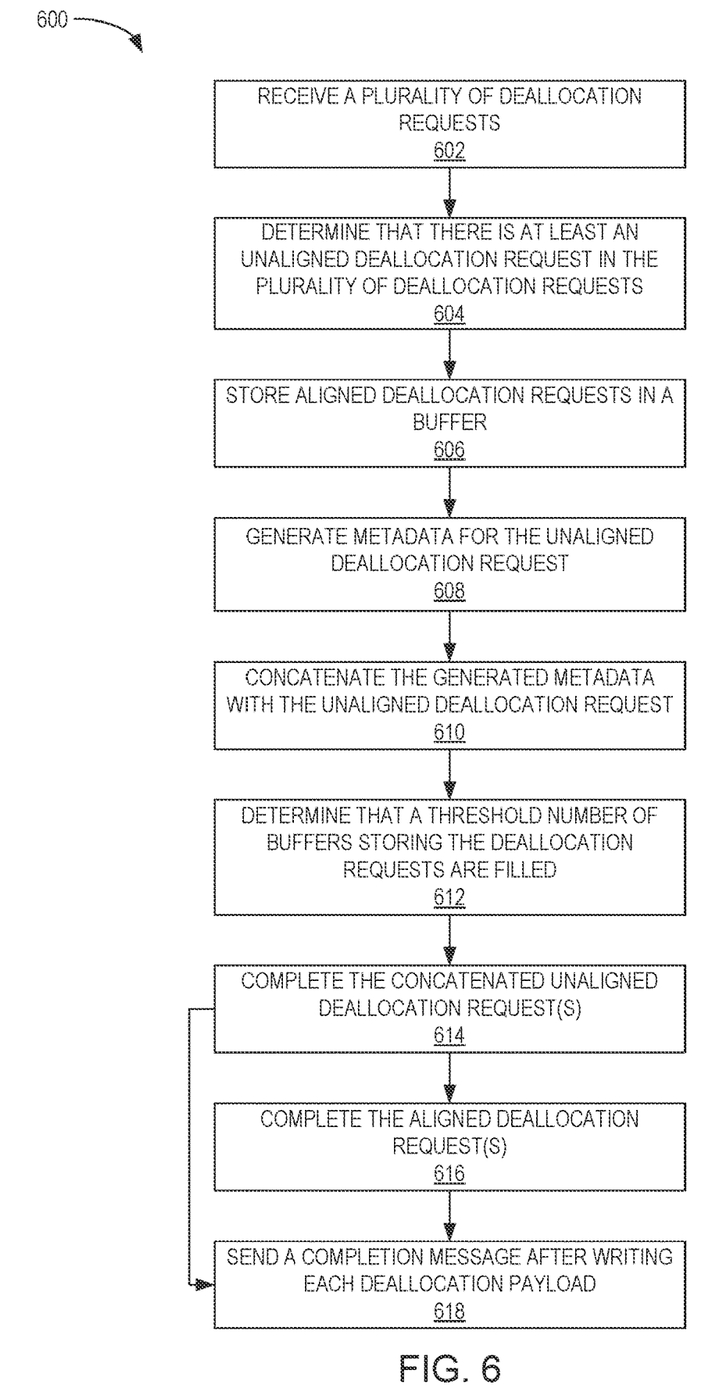
FIG. 6 is a flow diagram illustrating a method of performing deallocation requests, according to certain embodiments.

FIG. 6 is a flow diagram illustrating a method 600 of performing deallocation requests, according to certain embodiments. Method 600 may be implemented by a controller, such as the controller 108 of FIG. 1. Aspects of the storage system 100 of FIG. 1 may be referenced herein for exemplary purposes. At block 602, the controller 108 receives a plurality of deallocation requests. At block 604, the controller 108 determines that there is at least an unaligned deallocation request in the plurality of deallocation requests. An unaligned deallocation request is a deallocation request that has an LBA range that is either not aligned with a 'head', a 'tail', or both a 'head' and a 'tail' of a FMU boundary. An aligned deallocation request is a deallocation request that has an LBA range that is aligned with both a 'head' and a 'tail' of a FMU boundary.

At block 606, the controller 108 stores the aligned deallocation requests in a buffer, such as a delayed bitmap buffer. The buffer may be one of the plurality of buffers 502*a*-502*h* of FIG. 5, such as the first buffer 502*a*. At block 608, the controller 108 or the FTL 150 generates additional metadata for the unaligned deallocation request(s). The additional metadata includes a direction bit and a deallocation length bit, where the deallocation length bit may be a plurality of bits. At block 610, the controller 108 concatenates the generated additional metadata to a header of the FMU that includes the unaligned deallocation request. At block 612, the controller 108 determines that a threshold number of buffers storing the deallocation requests are filled. For example, the threshold number of buffers may be greater than one buffer but less than all buffers. In another example, the threshold number of buffers is equal to the total number of buffers storing deallocation commands. At block 614, the controller 108 completes the deallocation requests stored in the one or more buffers storing unaligned deallocation requests. For example, a buffer storing the unaligned deallocation requests may be the second buffer 502*b* of FIG. 5. At block 616, the controller 108 completes the aligned deallocation requests stored in the delayed bitmap buffer. At block 618, the controller sends a completion message after writing each deallocation payload.

By completing both aligned and unaligned deallocation requests together, the deallocation operation performance may be improved, the write amplification of the memory device may be reduced, and the deallocation operation may be more efficient.

In one embodiment, a data storage device includes a memory device and a controller coupled to the memory device. The controller is configured to receive a deallocation command corresponding to a plurality of deallocation requests, where each of the plurality of deallocation requests corresponds to a logical block address (LBA) range, determine that at least one of the plurality of deallocation requests is an unaligned deallocation request, generate a tag for metadata for the unaligned deallocation request, wherein the tag for the metadata includes a direction bit and a length bit, concatenate the metadata including the tag to an LBA range of the unaligned deallocation request, and complete the deallocation command using the metadata including the tag.

The unaligned deallocation request corresponds to either a head of the LBA range or a tail of the LBA range that is not aligned to a flash management unit (FMU) size. The controller is further configured to determine if the head of the unaligned deallocation request is unaligned, the tail of the unaligned deallocation request is unaligned, or both the head and the tail of the unaligned deallocation request are unaligned and either generate the tag for the metadata associated with the head of the unaligned deallocation request when the head of the unaligned deallocation request is unaligned or when both the head and the tail of the unaligned deallocation request are unaligned or generate the tag for the metadata associated with the tail of the unaligned deallocation request when the tail of the unaligned deallocation request is unaligned. The unaligned deallocation request is completed prior to completing an aligned deallocation request. The direction bit corresponds to a direction of reading the LBA range, wherein the direction corresponds to either reading the LBA range from a head of the LBA range to a tail of the LBA range or reading the LBA range from a tail of the LBA range to a head of the LBA range. The controller is further configured to determine that a head of an LBA range corresponding to the deallocation command or a tail of the LBA range corresponding to the deallocation command is unaligned to a mapping unit. A granularity of the mapping unit corresponds to a plurality of flash management units (FMUs). The controller is further configured to determine that the deallocation command is less than a flash management unit (FMU) size and store the deallocation command in a buffer. The controller is further configured to concatenate two or more deallocation commands that are stored in the buffer. The controller includes a plurality of buffers. Each buffer is configured to store one or more LBA ranges having a total size equal to a size of a mapping unit. The controller is further configured to execute one or more deallocation commands stored in a plurality of buffers. The executing occurs to a first one or more commands of a first buffer prior to a second one or more commands of a second buffer.

In another embodiment, a data storage device includes a memory device and a controller coupled to the memory device. The controller is configured to determine that a first buffer of a plurality of buffers comprises one or more unaligned deallocation commands and a second buffer of the plurality of buffers consists of aligned deallocation commands, generate a delayed deallocate bitmap for the second buffer, generate a tag for metadata for each of the one or more unaligned deallocation commands, where the tag for the metadata includes a direction bit and a length bit, store the plurality of buffers and a payload corresponding to the plurality of buffers in the memory device, and perform each deallocation command, where deallocation commands associated with the first buffer are performed prior to deallocation commands of the second buffer.

The plurality of buffers and the payload corresponding to the plurality of buffers is stored in volatile memory. The direction bit is 1 bit and the length bit is proportional to a size of the metadata. The controller is further configured to concatenate a received unaligned deallocation command to the first buffer when the first buffer includes at least a flash management unit (FMU) size of available storage space. The controller is further configured to determine that a threshold number of buffers of the plurality of buffers has been filled prior to performing each deallocation command. A flash translation layer (FTL) unit of the controller is configured to collect invalid data pointers and lengths in the first buffer.

In another embodiment, a data storage device includes memory means and a controller coupled to the memory means. The controller is configured to generate a tag for metadata for unaligned deallocation commands. The tag for the metadata indicates a read direction of a logical block address (LBA) range of an unaligned deallocation command and a length of the LBA range.

The controller is further configured to concatenate the metadata including the tag with the LBA range to form a concatenated deallocation command, store the concatenated deallocation command in a first buffer, store aligned deallocation commands in a second buffer, and perform deallocation commands of the first buffer prior to performing deallocation commands of the second buffer. The first buffer additionally stores aligned deallocation commands. Performing deallocation commands of the first buffer includes performing unaligned deallocation commands prior to aligned deallocation commands.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      receive a deallocation command corresponding to a plurality of deallocation requests, wherein each of the plurality of deallocation requests corresponds to a logical block address (LBA) range;
      determine that at least one of the plurality of deallocation requests is an unaligned deallocation request;
      generate a tag for metadata for the unaligned deallocation request, wherein the tag for the metadata comprises a direction bit and a length bit;
      concatenate the metadata including the tag to an LBA range of the unaligned deallocation request; and
      complete the deallocation command using the metadata including the tag.

2. The data storage device of claim 1, wherein the unaligned deallocation request corresponds to either a head of the LBA range or a tail of the LBA range that is not aligned to a flash management unit (FMU) size.

3. The data storage device of claim 2, wherein the controller is further configured to:
   determine if the head of the unaligned deallocation request is unaligned, the tail of the unaligned deallocation request is unaligned, or both the head and the tail of the unaligned deallocation request are unaligned; and
   either:
      generate the tag for the metadata associated with the head of the unaligned deallocation request when the head of the unaligned deallocation request is unaligned or when both the head and the tail of the unaligned deallocation request are unaligned; or
      generate the tag for the metadata associated with the tail of the unaligned deallocation request when the tail of the unaligned deallocation request is unaligned.

4. The data storage device of claim 1, wherein the unaligned deallocation request is completed prior to completing an aligned deallocation request.

5. The data storage device of claim 1, wherein the direction bit corresponds to a direction of reading the LBA range, wherein the direction corresponds to either:
   reading the LBA range from a head of the LBA range to a tail of the LBA range; or
   reading the LBA range from a tail of the LBA range to a head of the LBA range.

6. The data storage device of claim 1, wherein the controller is further configured to determine that a head of an LBA range corresponding to the deallocation command or a tail of the LBA range corresponding to the deallocation command is unaligned to a mapping unit.

7. The data storage device of claim 6, wherein a granularity of the mapping unit corresponds to a plurality of flash management units (FMUs).

8. The data storage device of claim 6, wherein the controller is further configured to:
   determine that the deallocation command is less than a flash management unit (FMU) size; and
   store the deallocation command in a buffer.

9. The data storage device of claim 8, wherein the controller is further configured to concatenate two or more deallocation commands that are stored in the buffer.

10. The data storage device of claim 9, wherein the controller comprises a plurality of buffers, and wherein each buffer is configured to store one or more LBA ranges having a total size equal to a size of a mapping unit.

11. The data storage device of claim 1, wherein the controller is further configured to execute one or more deallocation commands stored in a plurality of buffers, wherein the executing occurs to a first one or more commands of a first buffer prior to a second one or more commands of a second buffer.

12. A data storage device, comprising:
   a memory device; and
   a controller coupled to the memory device, wherein the controller is configured to:
      determine that a first buffer of a plurality of buffers comprises one or more unaligned deallocation commands and a second buffer of the plurality of buffers consists of aligned deallocation commands;
      generate a delayed deallocate bitmap for the second buffer;
      generate a tag for metadata for each of the one or more unaligned deallocation commands, wherein the tag for the metadata includes a direction bit and a length bit;
      store the plurality of buffers and a payload corresponding to the plurality of buffers in the memory device; and
      perform each deallocation command, wherein deallocation commands associated with the first buffer are performed prior to deallocation commands of the second buffer.

13. The data storage device of claim 12, wherein the plurality of buffers and the payload corresponding to the plurality of buffers is stored in volatile memory.

14. The data storage device of claim 12, wherein the direction bit is 1 bit and the length bit is proportional to a size of the metadata.

15. The data storage device of claim 12, wherein the controller is further configured to concatenate a received unaligned deallocation command to the first buffer when the first buffer comprises at least a flash management unit (FMU) size of available storage space.

16. The data storage device of claim 12, wherein the controller is further configured to determine that a threshold number of buffers of the plurality of buffers has been filled prior to performing each deallocation command.

17. The data storage device of claim 12, wherein a flash translation layer (FTL) unit of the controller is configured to collect invalid data pointers and lengths in the first buffer.

18. A data storage device comprising:
  memory means; and
  a controller coupled to the memory means, wherein the controller is configured to:
    generate a tag for metadata for unaligned deallocation commands, wherein the tag for the metadata indicates a read direction of a logical block address (LBA) range of an unaligned deallocation command and a length of the LBA range;
    concatenate the metadata including the tag with the LBA range to form a concatenated deallocation command;
    store the concatenated deallocation command in a first buffer;
    store aligned deallocation commands in a second buffer; and
    perform deallocation commands of the first buffer prior to performing deallocation commands of the second buffer.

19. The data storage device of claim 18, wherein the first buffer additionally stores aligned deallocation commands, and wherein performing deallocation commands of the first buffer comprises performing unaligned deallocation commands prior to aligned deallocation commands.

* * * * *